United States Patent

Duncan et al.

Patent Number: 5,987,861
Date of Patent: Nov. 23, 1999

[54] PEA HARVESTER

[76] Inventors: Allister T. Duncan, 1015 Alvey Street, Morden, MB, Canada, R6M 1H4; James Michael McDonald, 1920 Skyline Dr., Minot, N. Dak. 58701

[21] Appl. No.: 08/999,563

[22] Filed: Jun. 23, 1997

Related U.S. Application Data

[60] Provisional application No. 60/022,630, Jul. 25, 1996.

[51] Int. Cl.⁶ .................................................. A01D 43/00
[52] U.S. Cl. ............................ 56/14.4; 56/327.1; 460/142
[58] Field of Search .................................. 56/13.3, 14.4, 56/17.4, 17.5, 16.2, 221, 222, 226, 364, 220, 127, 327.1; 460/131, 132, 16, 141, 142

[56] References Cited

U.S. PATENT DOCUMENTS

| | | | |
|---|---|---|---|
| 3,769,988 | 11/1973 | Burenga | 460/142 |
| 3,940,910 | 3/1976 | d'Acremont | 56/14.4 |
| 3,958,399 | 5/1976 | Schoeneberger | 56/14.4 X |
| 4,052,992 | 10/1977 | Taylor | 460/142 |
| 4,216,641 | 8/1980 | Koch et al. | 56/14.4 |
| 5,056,303 | 10/1991 | Lawrence | 56/327.7 |

*Primary Examiner*—Robert E. Pezzuto
*Attorney, Agent, or Firm*—Jacobson & Johnson

[57] ABSTRACT

The present invention provides an improved harvester particularly of the type for harvesting peas. The harvester employees an improved technique of harvesting peas and similar crops. Instead of attempting to break the stem of the plant by pulling it away from the ground, which is the usual technique employed by current harvesters, the individual plants are drawn upwards then cut with a cutting bar or like device. This technique may be utilized by harvesters built specifically for this type of harvesting, or by existing harvesters after modifying the reel of the harvester, The improved harvester comprises a cutting bar, a rotary reel, a plurality of tines arranged in a plurality of rows on the reel, cam tracks and cam followers for raising the plurality of tines relative to crops in front of the cutting bar, as the reel rotates, thereby lifting the crops upwards to a position for cutting.

11 Claims, 7 Drawing Sheets

PEA HARVESTER

The present application claims the benefits under 35 U.S.C. 119e of U.S. provisional application Ser. No. 601022, 630 filed on Jul. 25, 1996.

FIELD OF THE INVENTION

The present invention provides an improved harvester particularly of the type for harvesting peas.

BACKGROUND

Harvesters for harvesting peas and similar crops are well known. These harvesters usually have a rotary reel mounted at the front, with a plurality of tines fixed to the reel. As the harvester moves through the crops the reel rotates causing the tines to pull through the crop. The tines pull the plants away from the ground breaking the stems of the dry plants, or tearing the plant out of the ground.

If the plants being harvested are not sufficiently dry, or the stems are otherwise too strong, the tines of the harvester may pull through a portion of the crop without breaking the stems of the plants. This may leave that portion of the crop unharvested resulting in higher crop loss which can be costly to the farmer.

SUMMARY

The improved pea harvester employs an improved technique of harvesting peas and similar crops. Instead of using the usual technique of attempting to break the stem of the plant by pulling it away from the ground the peas or other crops are drawn upwards then cut with a cutting bar or like device. This technique may be utilized by harvesters built specifically for this type of harvesting, or by existing harvesters after modifying the reel of the harvester.

According to a first aspect of the present invention there is provided a method of harvesting a pea or like crop comprising: advancing a cutting bar in a forward direction through the crops; moving a plurality of tines rearwards through the crops towards the cutting bar; and raising the plurality of tines relative to said crops in front of the cutting bar thereby lifting said crops upwards to a position for cutting.

The method preferably includes cutting the stems of the crops, and moving the crops rearwards with the tines.

According to a second aspect of the present invention there is provided a harvester for traveling in a forward direction over the ground and harvesting peas and like crops, said harvester comprising: an elongate cutting bar arranged transverse of the forward direction and spaced upwards from the ground; an elongate rotary reel arranged forward of the cutting bar and having a reel axis of rotation transverse of the forward direction; a plurality of tines spaced at positions distributed around and along the axis of rotation of the reel, each one of said plurality of tines being mounted on said reel for movement therewith and extending outwards therefrom; means for rotating the reel about the reel axis in a direction to move the tines rearwards below the reel axis towards the cutting bar; and means for raising the tines upwards towards the reel axis in front of the cutting bar to lift the crops upwards to a position for cutting by the cutting bar.

Preferably each tine is pivotally mounted such that it may pivot about a tine axis of rotation which lies parallel to the reel axis. As each tine passes through the crops and below the reel axis of rotation the means for raising the tines rotates the tine about the tine axis in a direction counter to the direction of rotation of the reel thereby causing a free end of the tine to move upwards relative to the cutting bar to a position above and forward of the cutting bar thus lifting the peas for cutting.

BRIEF DESCRIPTION OF THE DRAWINGS

In the accompanying drawings, which illustrate an exemplary embodiment of the present invention.

DETAILED DESCRIPTION

Figure 1:
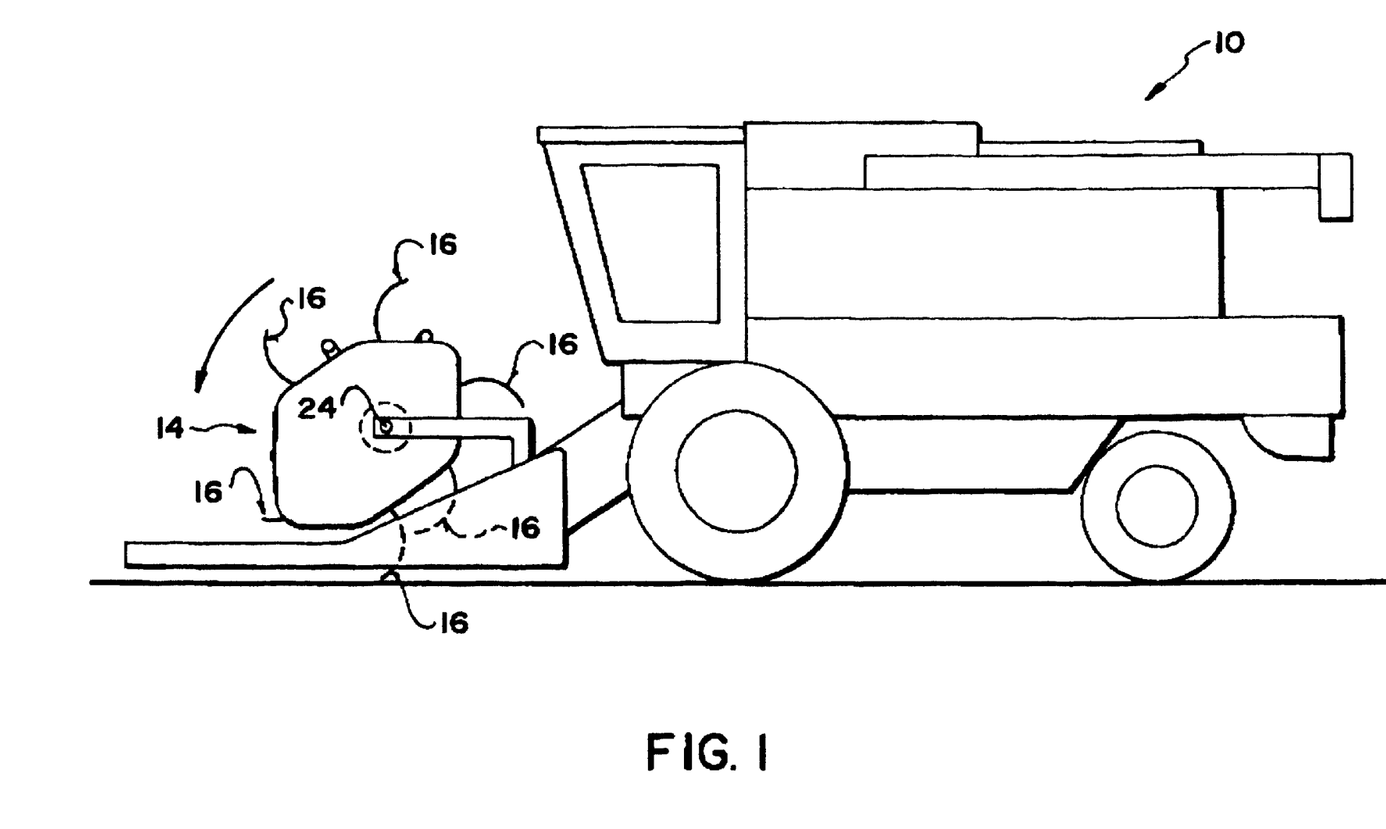
FIG. 1 is a side view of the harvester.
Figure 2:
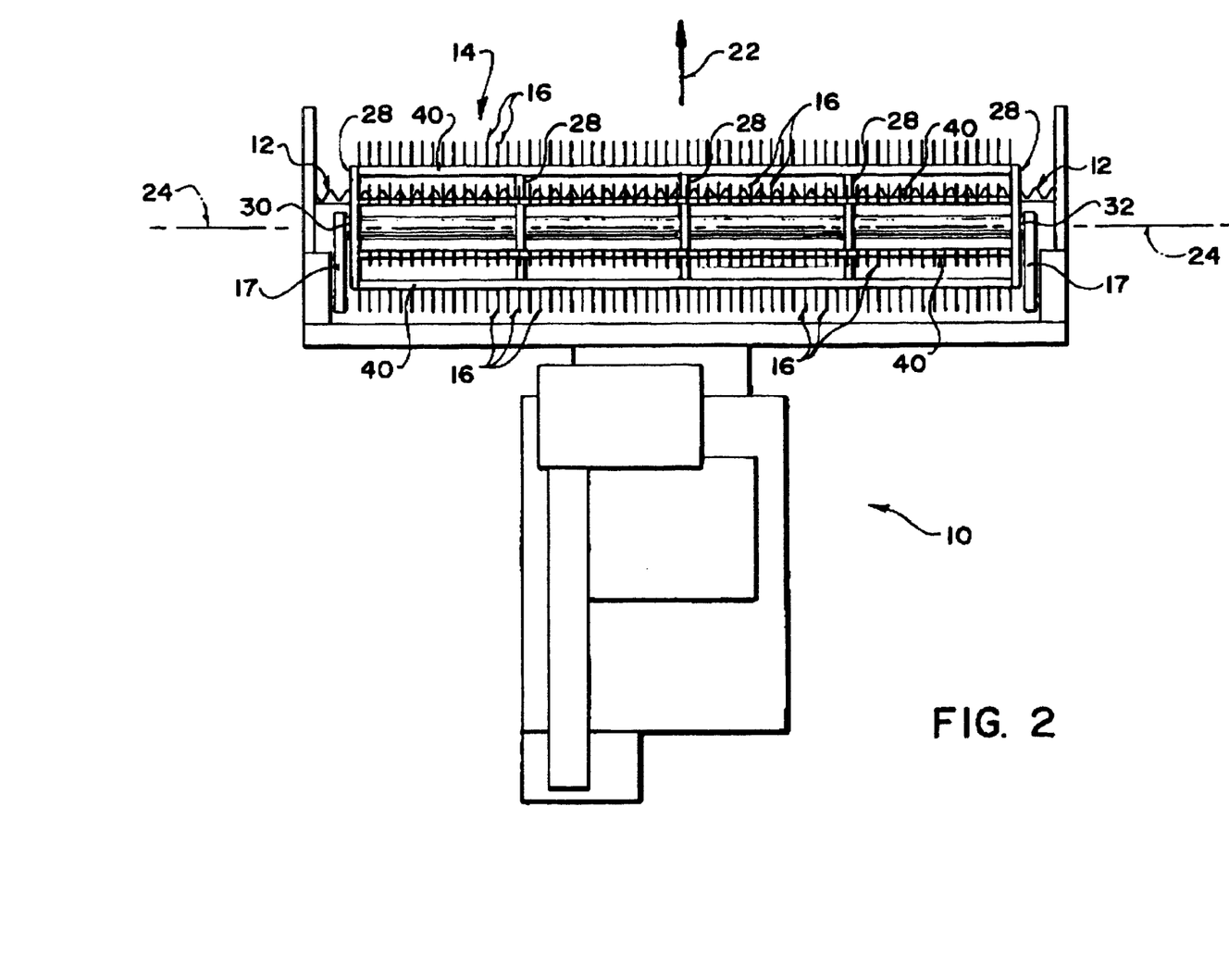
FIG. 2 is a top view of the harvester.

Referring to FIGS. 1 and 2 the improved pea harvester is shown generally at 10. The harvester 10 employs an improved technique of harvesting peas and similar crops. Instead of attempting to break the stems of individual plants by pulling them away from the ground, which is the technique employed by most current harvesters, the individual plants are drawn upwards and then cut with a cutting bar or like device. This technique may be utilized by harvesters built specifically for this type of harvesting, or by existing harvesters after modifying the reel of the harvester. In either case the harvester 10 will include a cutting bar 12, a rotary reel 14, a plurality of tines 16, and means for raising the tines 17.

The cutting bar 12 is elongate and is arranged across the front of the harvester 10, Such that it is spaced upwards from the ground and configured to lie transverse of the direction of forward movement 22 of the harvester 10. Elongate cutting bars are a well known feature on combine harvesters, and many are commercially available. Any appropriate cutting bar may be used when employing this new technique.

Figure 3:
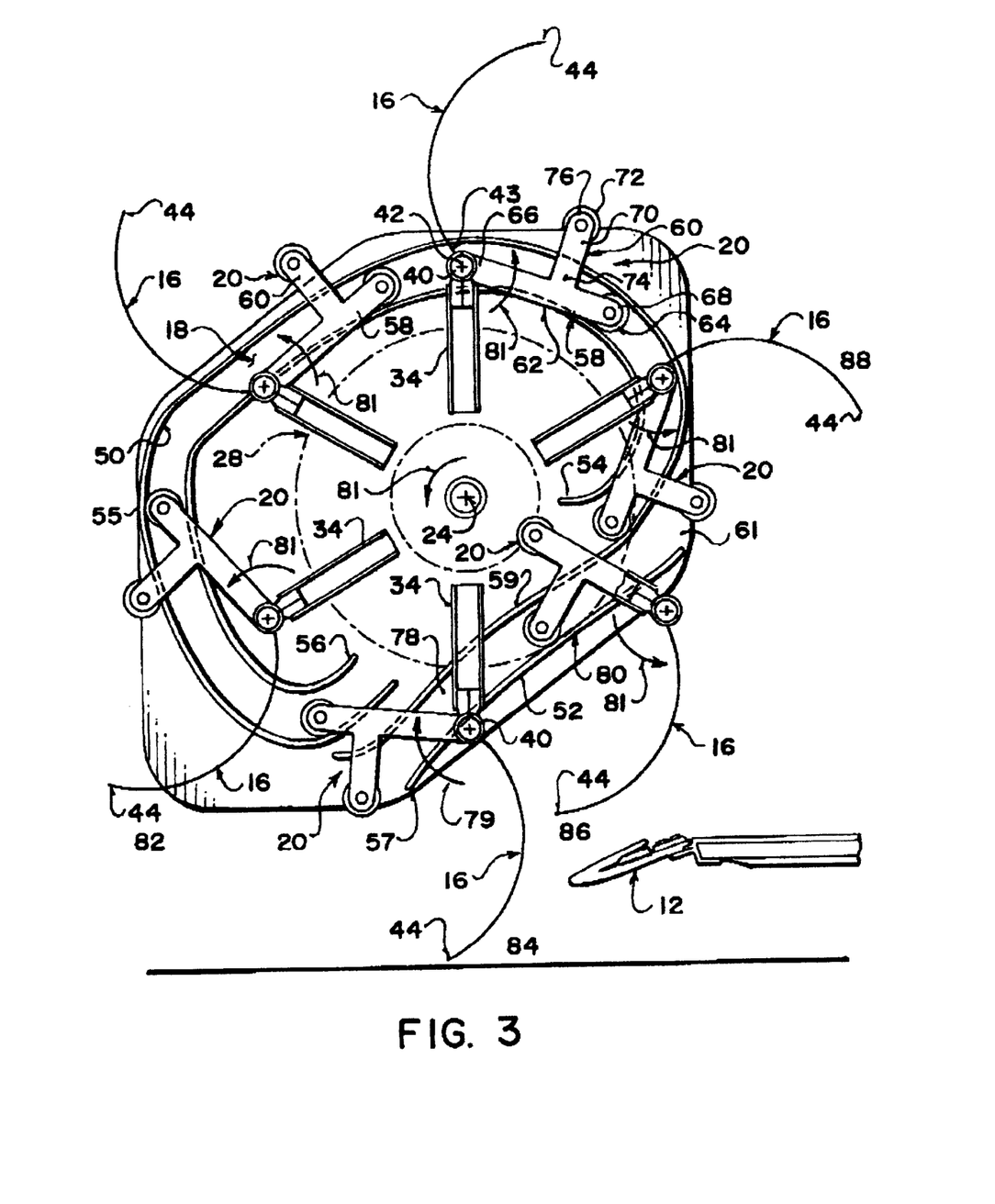
FIG. 3 is a side view of the rotary reel.

Referring to FIGS. 2 and 3 the rotary reel 14 is mounted at the front of the harvester forward of the cutting bar 12. The rotary reel 14 is elongate and like the cutting bar 12 is arranged transverse of the direction of forward movement 22 of the harvester 10. The rotary reel 14 has an axis of rotation 24 which is arranged to lie parallel to the cutting bar 12. The reel 14 rotates about the axis 24 in a direction 81 such that as the reel 14 rotates the portion of the reel passing below the axis 24 is moving rearwards towards the cutting bar 12.

The reel 14 includes a plurality of elongate bats 40 which move with the reel. The bats 40 are arranged to lie parallel to the reel axis 24, and are spaced annularly around, and radially outwards from the reel axis 24. Each one of the plurality of bats 40 is mounted on the reel 14 such that it may rotate relative to the reel 14 about an axis of rotation 42 lying parallel to the reel axis 24.

To mount the plurality bats 40 on the reel 14 a plurality of bat mounts 28 are utilized. The plurality of bat mounts 28 are arranged such that one mount lies at each end 30 and 32 of the reel 14, with the remainder of the mounts 28 being spaced longitudinally along the length of the reel 14. Each bat mount 28 is spoked having a plurality of spokes 34, one for each bat 40, extending radially outwards from the reel axis 24. The spokes 34 of each mount 28 are aligned with respective spokes 34 on adjacent mounts 28. The bats 40 are mounted on aligned spokes 34 between the ends of the aligned spokes 34.

The plurality of tines 16 are arranged in rows distributed around the axis of rotation 24 of the reel 14 for movement with the reel 14 as the reel rotates. Each row of tines 16 is connected to a respective elongate bat 40 with individual tines 16 at positions spaced along the bat 40. Each tine 16 is fixed to the bat 40 at a first end 43 and extends outwards from the bat 40 to a free second end 44 such that the tines 16 pivot with the bat 40 as the bat 40 rotates about the axis of rotation 42.

Each one of the plurality of tines 16 is curved in shape and is arranged to curve downwards and forwards to its free end 44 as it passes below the reel 14. The tines 16 are curved to facilitate lifting of the crops.

The rotary reel 14 includes means for raising the tines 17 upwards towards the reel axis 24 as the tines 16 pass in front of the cutting bar 12 thereby lifting the crops upwards to a position for cutting by the cutting bar 12. The means fur raising the tines 17 comprise a cam track 18 and a plurality of twin cam followers 20 arranged at each end 30 and 32 of the reel 14.

Each cam track 18 is fixed relative to the rotary reel 14 and is arranged around the reel 14 and reel axis 24. Therefore the reel 14, when rotating, moves relative to the cam tracks 18.

The cam tracks 18 each include a first cam track section 50 and a second cam track section 52. The first cam track section 50 is arranged to extend over and around the rotary reel 14 from a first point 54 forwards to a second point 55 lying in front of the reel axis 24 and then downwards and rearwards from the second point 55 to an end at a third point 56 located forwards of and below the reel axis 24. The second cam track section 52 is arranged to extend below the reel axis 24 from a fourth point 57 adjacent and below the third point 56 of the first cam track section 50 upwards and rearwards at a steep angle to a fifth point 59 and then upwards and rearwards at a more gradual angle to a sixth position 61 located rearwards of the reel axis 24 and adjacent the first point 54 of the first cam track section 50.

A twin cam follower 20 is mounted at each end of a respective bat 40 with one twin cam follower 20 arranged to cooperate with each cam track 18. Said twin cam followers 20 are mounted on the bat 40 and are mounted at an angle to the tines 16 fixed to the bat 40 such that the angle between the twin cam follower 20 and the tines 16 remains constant. The twin cam followers 20 engage the cam tracks 18 following the cam tracks 18 as the reel 14 rotates. Pivotal movement of the twin cam followers 20 results in rotation of the bats 40 causing a corresponding pivoting movement of the tines 16.

Each twin cam follower 20 comprises a first cam follower 58 and a second cam follower 60. The first cam follower 58 engages the first cam track section 50 and is arranged to follow the first cam track section 50 as the reel 14 rotates while the second cam track follower 60 engages the second cam track section 52 and is arranged to follow the second cam track section 52 as the reel 14 rotates.

The first cam follower 58 comprises an elongate first cam follower arm 62 and a roller 64. The first cam follower arm 62 has a first end 66 and a second end 68 and is fixed at the first end 66 to a corresponding bat 40 extending radially outwards from the bat 40 to the second end 68. The first cam follower arm 62 is fixed to the bat 40 such that angular movement of the second end 68 of the first cam follower arm 58 relative to the first end 66 of the first cam follower arm 58 pivots the twin cam follower 20 causing the bat 40 to rotate about the axis 42.

The roller 64 is mounted at the second end 68 of the first cam follower arm 62 and is arranged to engage the first cam track section 50 following the first cam track section 50 as the reel 14 rotates. A change in the position of the roller 64 as it moves along the first cam track section 50 causes angular movement of the second end 68 of the first cam follower arm 58 relative to the first end 66 of the first cam follower arm 56 thus rotating the bat 40 and causing the corresponding row of tines 16 on the, bat 40 to pivot.

The second cam follower 60 is fixed to the first cam follower 58, and comprises an elongate second cam follower arm 70 and a second roller 72. The second cam follower arm 70 has a first end 74 and a second end 76 and is fixed at a first end 74 to the first cam follower arm 62 and extends outwards therefrom to a second end 76. The second cam follower arm 70 is shorter in length than the first cam follower arm 62 and is fixed to the first cam follower arm 62 at a substantially right angle. The second cam follower arm 70 is fixed to the first cam follower arm 62 such that angular movement of the second end 76 of the second cam follower arm 70 relative to the first end 74 of the second cam follower arm 70 will cause the first cam follower arm 62 to pivot thereby pivoting the twin cam follower 20 rotating the bat 40 about the axis 42.

roller 72 is mounted at the second end 76 of the second cam follower arm 70 for engaging the second cam track section 52 and traveling therealong. A change in the position of the roller 72 as it moves along the second cam track section 52 causes angular movement of the second end 76 of the second cam follower arm 70 relative to the first end 74 of the second cam follower arm 70 thus pivoting the first cam follower arm 60 and rotating the bat 40 causing the corresponding row of tines 16 on the bat 40 to pivot.

The first cam track section 50 describes a pathway such that as each one of the first cam followers 58 travels along the first cam track section 50 from the second point 55 to the third position 56 it is pivoted relative to the reel 14 in a direction 81 the same as the direction 81 that the reel 14 rotates. This causes the row of tines 16 to pivot in the same direction 81 as the reel 14 rotates resulting in a downward and rearward movement of the free end 44 of each of the tines 16.

A first portion 78 of the second cam track section 52 describes a pathway such that as each one of the plurality of second cam followers 60 travels upwards and rearwards along the second cam track section 52 from the fourth point 57 to the fifth point 59 the second cam follower 60 is rotated relative to the reel 14 in a direction 79 opposite to the direction 81 that the reel 14 rotates. This causes the row of tines 16 on the corresponding bat 40 to rotate in a direction 79 opposite to the direction of rotation 81 of the reel 14 thereby resulting in the free ends 44 of the tines 16 moving upwards relative to the cutting bar 12 and then rearwardly to a position above and just forward of the cutting bar 12.

A second portion 80 of the second cam track section 52 describes a pathway such that as the second cam follower 60 continues rearwards along the second cam track section 52 from the fifth point 59 to the sixth point 61 it moves upwardly and rearwardly at an angle such that the second cam follower arm 60 is rotated relative to the reel 14 in the same direction of rotation 81 that the reel 14 rotates. This causes the row of tines 16 fixed to the corresponding bat 40 to rotate in the same direction 81 as the reel 14 thereby causing the free end 44 of each the tine 16 to move upwards and rearwards away from the cutting bar 12.

Figure 4:
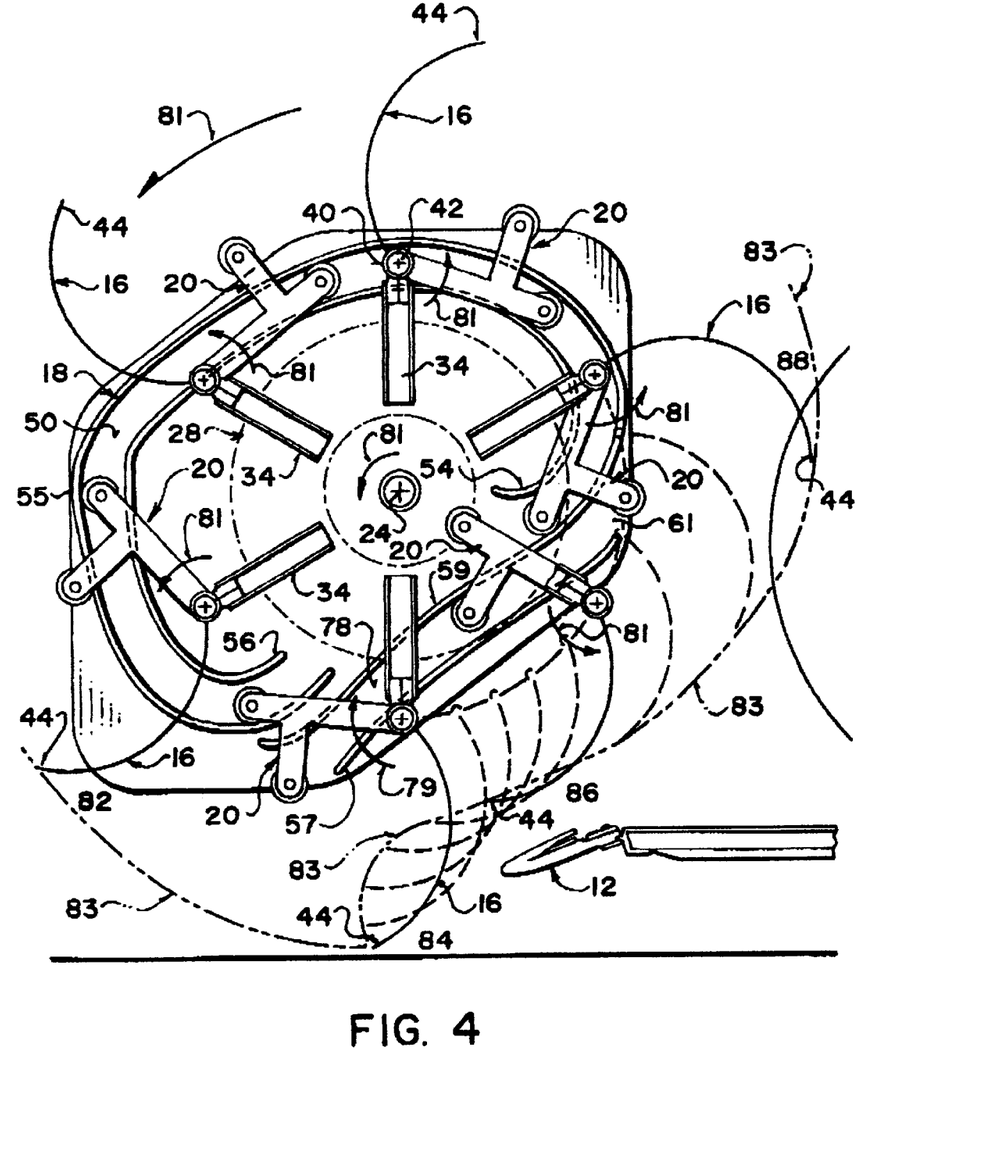
FIG. 4 is a side view of the rotary reel showing the pathway of the tines.

Referring to FIG. 4 this motion results in each tine 16 describing a pathway 83 such that the free end 44 of each tine 16 moves downwards and rearwards through the crops from a first position 82 above the crops to a second position 84 adjacent the ground and stems of the crops. The tines 16 then move upwards from the second position 84 lifting the bodies of the crops upwards to a third position 86 above the cutting bar 12. The tines 16 then move rearwards with the crops to the cutting bar 12 which cuts the stems of the crops. The tines 16 then pivot upwards and rearwards to a rearwardmost position 88 above and to the rear of the cutting bar 12 releasing the cut crops rewards of said cutting bar 12.

In use the harvester 10 travels in a forward direction over the ground harvesting the crops. This advances the reel 14 and cutting bar 12 through the crops. The reel 14 is rotated such that each row of tines 16 moves continuously about the reel axis 24 such that the tines 16 move through the crops downwards and rearwards towards the cutting bar 12 from a position in front of the reel 14 to a position adjacent the ground and stems of the crops. The plurality of tines 16 then move upwards relative to the crops lifting the crops in front of the cutting bar 12 to a position for cutting, and rearwards to the cutting bar 12 for cutting.

Figure 5:
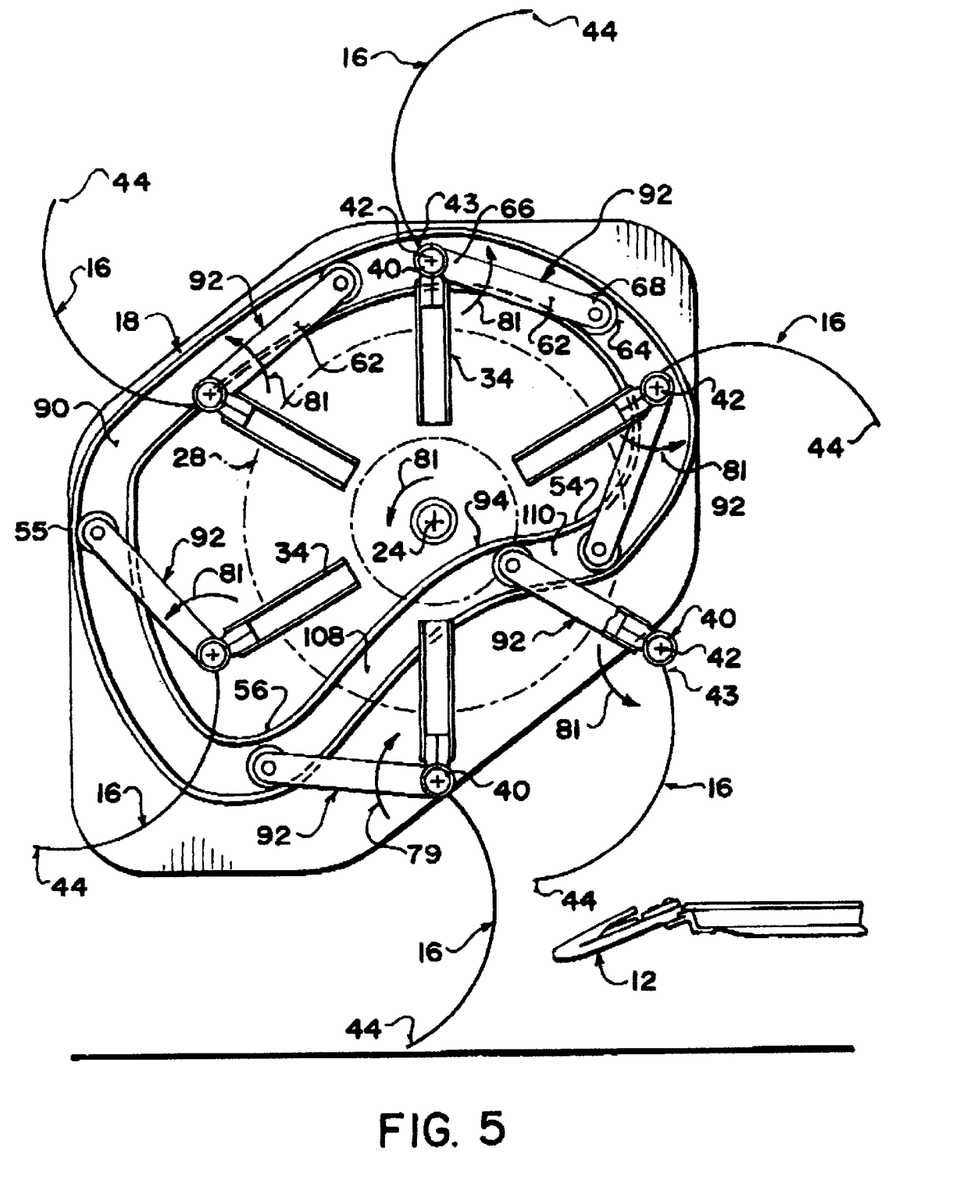
FIG. 5 is a side view of an alternative arrangement of the rotary reel.

In an alternative arrangement of the harvester 10, shown in FIG. 5, the means for raising the tines 17 comprise a cam track 18 having a single continuous track section 90 and a plurality of single cam followers 92. One cam track 18 and a plurality cam followers 92 is arranged at each end 30 and 32 of the reel 14. Except where indicated in the following the harvester 10 is otherwise the same as that described above.

The continuous track section 90 of each cam track 18 is arranged to extend over and around the rotary reel 14 from a first point 54 forwards to a second point 55 lying in front of the reel axis 24 and then downwards and rearwards from the second point 55 to a third point 56 located forwards of and below the reel axis 24 in a similar arrangement to that of the first track section 50 described in the preceding. The continuous track section 90 then extends from the third point 56 upwards and rearwards at a steep angle to a fourth point 94 and then upwards and rearwards at a more gradual angle to the first point 54 thereby closing the loop.

A single cam follower 92 replaces each twin cam follower 20 described in the preceding. The single cam follower 92 is mounted at each end of a respective bat 40 at an angle to the tines 16 and is fixed to the bat 40 such that the angle between the single cam follower 92 and the tines 16 remains constant. The single cam followers 92 engage the cam tracks 18 following the cam tracks 18 as the reel 14 rotates. Pivotal movement of a single cam follower 92 results in rotation of a corresponding bat 40 causing a corresponding pivoting movement of the tines 16.

The single cam follower 92 comprises a cam follower arm 62 which has the same configuration and components as the first cam follower arm 62 of the twin cam follower 20.

The continuous track section 90 describes a pathway such that as each one of the single cam followers 92 travels along the continuous track section 90 from the second point 55 to the third point 56 it is pivoted relative to the reel 14 in a direction 81 the same as the direction 81 that the reel 14 rotates. This causes the row of tines 16 to pivot in the same direction 81 as the reel 14 rotates resulting in a downward and rearward movement of the free end 44 of each of the tines 16.

A first portion 108 of the continuous track 90 extends between the third point 56 and the fourth point 94 and describes a pathway such that as each one of the single cam followers 92 travels upwards and rearwards along the continuous track section 90 from the third point 56 to the fourth point 94 the single cam follower 92 is rotated relative to the reel 14 in a direction 79 opposite to the direction 81 that the reel 14 rotates. This causes the row of tines 16 on the corresponding bat 40 to rotate in a direction 79 opposite to the direction of rotation 81 of the reel 14 thereby resulting in the free ends 44 of the tines 16 moving upwards relative to the cutting bar 12 and then rearwardly to a position above and just forward of the cutting bar 12.

A second portion 110 of the continuous track section 90 describes a pathway such that as each single cam follower 92 continues rearwards along the continuous track section 90 from the fourth point 94 to the first point 54 it moves upwardly and rearwardly at an angle such that the single cam follower 92 is rotated relative to the reel 14 in the same direction of rotation 81 that the reel 14 rotates. This causes the row of tines 16 fixed to the corresponding bat 40 to rotate in the same direction 81 as the reel 14 such that the free end 44 of each the tine 16 moves upwards and rearwards away from the cutting bar 12.

Figure 6:
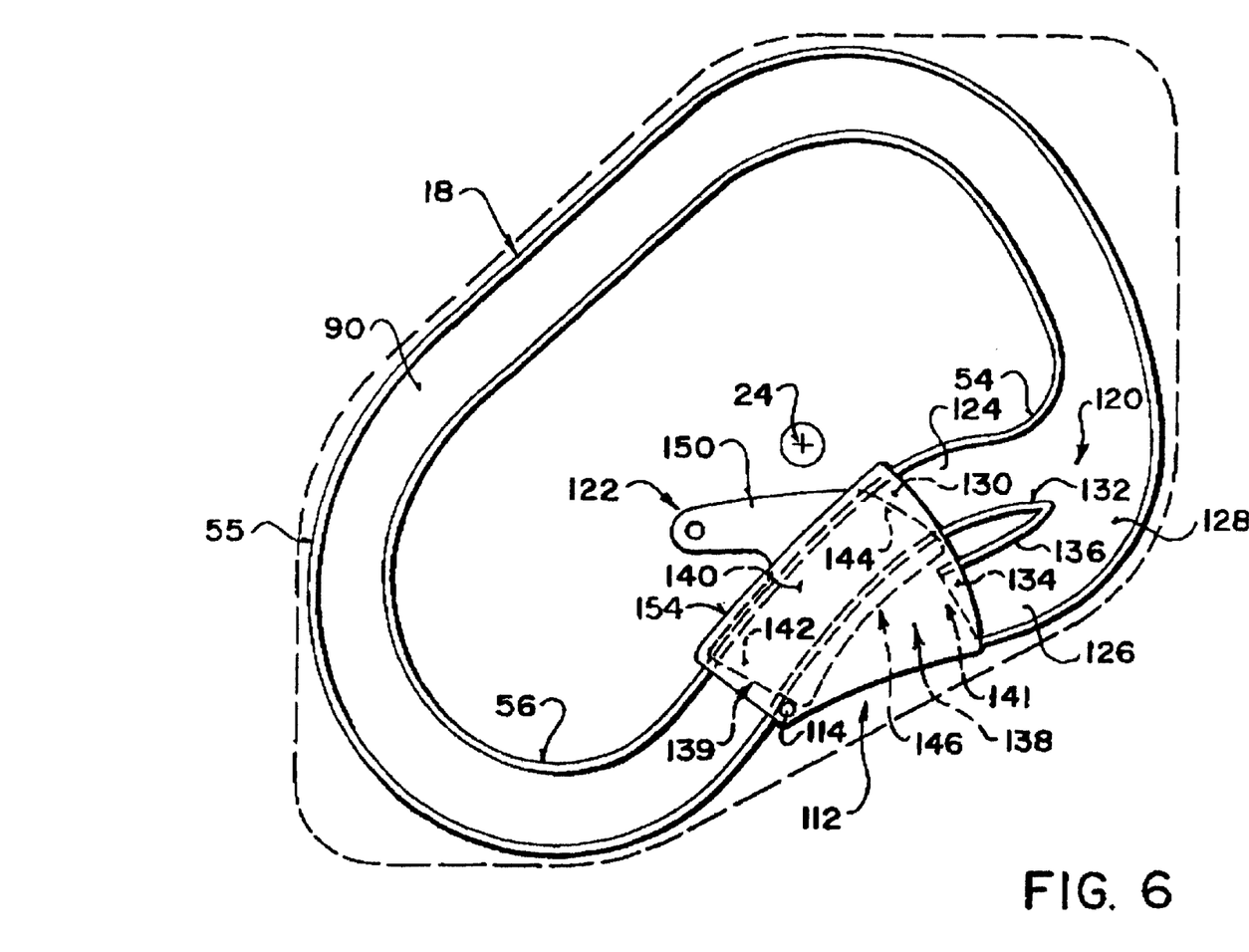
FIG. 6 is a side view of the cam track of the second alternative arrangement showing the switch mechanism in a first position.
Figure 7:
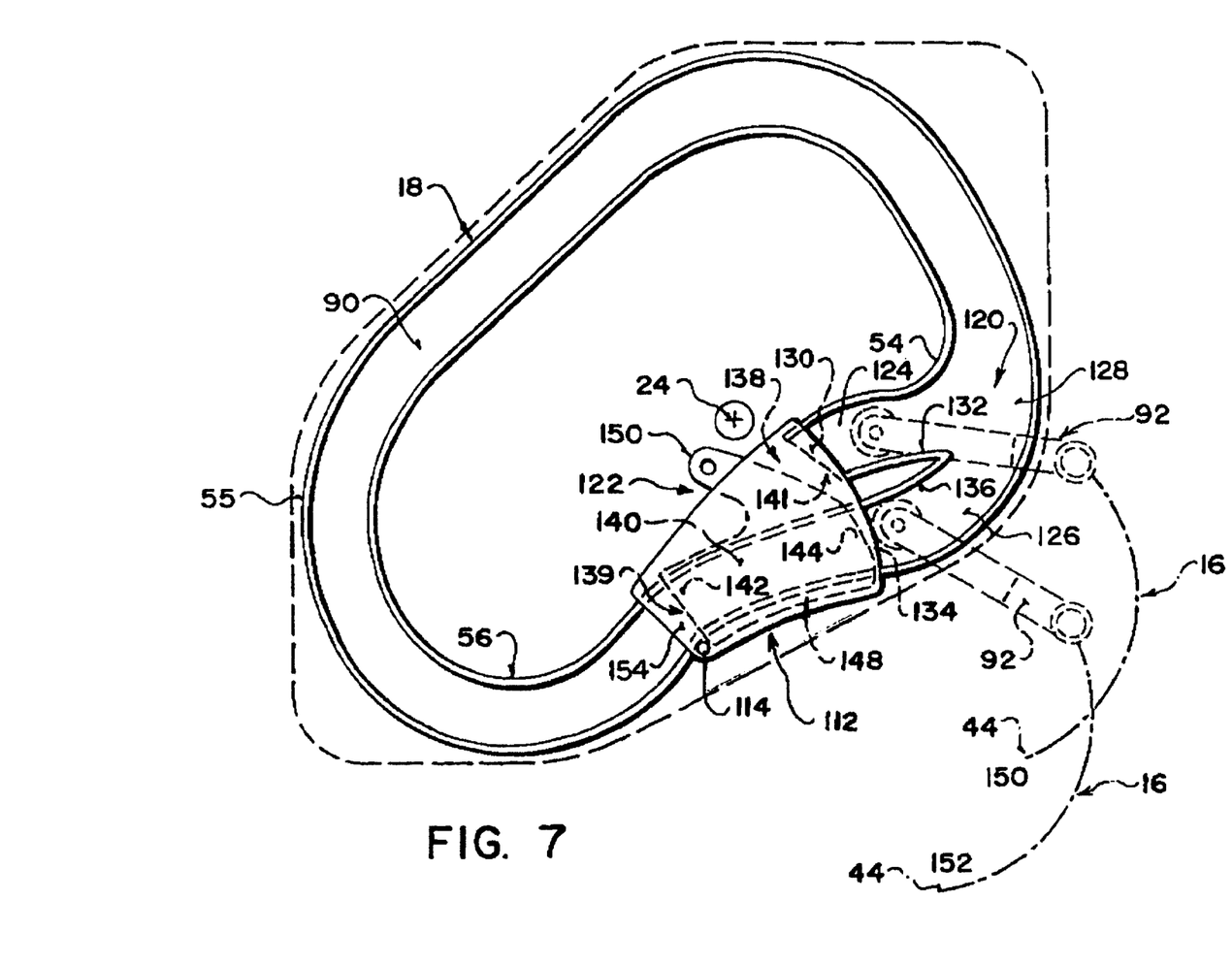
FIG. 7 is a side view of the cam track of the second alternative arrangement showing the switch mechanism in a second position.

Referring to FIGS. 5, 6, and 7 another alternative arrangement of the means for raising the tines 17 is shown. In this arrangement the means for raising the tines 17 include a means for selectively varying the height to which the tines are raised 112. The means for varying the height 112 comprise a branch 120 in the a continuous track 90 and a switch 122. Except where indicated in the following the harvester 10 is otherwise the same as that described above.

The branch 120 is located adjacent and upstream of the first point 54 in each cam track 18 and comprises a first pathway 124 and a second pathway 126 arranged to align vertically with one another and arranged to converge into a single pathway 128 at a downstream end of the branch 120. The first pathway 124 has a first end 130 at an upstream end of the branch 120 and a second end 132 at the downstream end of the branch 120. Likewise the second pathway 126 has a first end 134 at an upstream end of the branch 120 and a second end 136 at the downstream end of the branch 120.

A break 138 in the continuous track 90 extends from a point 114 on the continuous track 90 to the first end 130 of the first pathway 124 of the branch 120 and to the first end 134 of the second pathway 126 of the branch 120. The break 138 has a first end 139 and a second end 141 and extends therebetween. The first end 139 of the break is arranged in the continuous track 90 at the point 114 on the continuous track 90, and the second end 141 of the break 138 is arranged at the first end 130 of the first pathway 124 of the branch 120 and the first end 134 of the second pathway 126 of the branch 120.

The switch 122 comprises a section of track 140 having a first end 142 and a second end 144 arranged such that the first end 142 lies upstream of the second end 144 and adjacent the point 114 of the cam track 18. The second end 144 lies downstream of the first end 142. The switch 122 is pivotally mounted on the cam track 18 at the point 114 such that it can be pivoted between a first position 146 and a second position 148. A lever arm 150 is fixed to the switch 122 and may be actuated to move the switch 122 between the first and second positions 146 and 148.

When in the first position 146 the switch 122 spans the break 138 between the point 114 on the cam track 18 and the first end 130 of the first pathway 124 of the branch 120. As the cam follower 92 travels along the cam track 18 from third point 56 to the point 114 and then to the first end 130 of the first pathway 124 of the branch 120 the cam follower 92 moves upwards and rearwards at a steep angle such that it is rotated relative to the reel 14 in a direction 79 opposite to the direction 81 that the reel 14 rotates. This causes the row of tines 16 on the corresponding bat 40 to rotate in a direction 79 opposite to the direction of rotation 81 of the reel 14 thereby resulting in the free ends 44 of the tines 16 moving upwards to a first height 150 relative to the cutting bar 12 and then rearwardly to a position above and just forward of the cutting bar 12.

When in the second position 148 the switch 122 spans the break 138 between the point 114 on the cam track 18 and the first end 134 of the second pathway 126 of second pathway 126 of the branch 120. As the cam follower 92 travels along the cam track 18 from third point 56 to the point 114 and then to the first end 138 of the second pathway 126 the cam follower 92 moves upwards and rearwards at a less steep angle than when in the first position 146. This results in the free ends 44 of the tines 16 moving upwards to a second height 152 relative to the cutting bar 12 and then rearwardly to a position above and just forward of the cutting bar 12. The second height 152 to which the tines 16 are raised is lower than the first height 150.

An access panel 154 is positioned over the switch 122 to allow access to the switch 122 for repair and maintenance.

Although the means for varying the height 112 described above has a branch with two pathways, the means for varying the height 112 may include a branch 120 having any appropriate number of pathways and the switch 122 may be selectively moved between any corresponding number of positions.

While one embodiment of the present invention has been described in the foregoing, it is to be understood that other embodiments are possible within the scope of the invention. The invention is to be considered limited solely by the scope of the appended claims.

We claim:

1. A harvester for traveling in a forward direction over the ground and harvesting a crop, said harvester comprising:
    an elongate cutting bar arranged transverse of the forward direction;
    an elongate rotary reel arranged forward of the cutting bar and having a reel axis of rotation transverse of the forward direction;
    a plurality of tines spaced apart and arranged in rows distributed around and along the axis of rotation of the reel, each one of said plurality of tines being mounted on said reel for movement therewith and extending outwards therefrom;
    means for rotating the reel about the reel axis in a direction to move the tines rearward passing below the reel axis towards the cutting bar;
    cam guide means fixed to the harvester comprising:
        a first cam track section arranged to extend over and around the reel from a rearward position forward to a position in front of the reel axis and then downward and rearward therefrom to a position in front of and below the reel axis; and
        a second cam track section arranged to extend from a position below the reel axis upward to a position rearward of the reel axis; and
    cam follower means connected to the tines on the reel for following the cam guide means and guiding the movement of the tines as the reel rotates such that free ends of the tines are displaced upward towards the reel axis in front of the cutting bar to lift the crop upward to a position in front of the cutting bar for cutting by the cutting bar;
    wherein the cam follower means comprise:
        a plurality of first cam followers each being connected to a respective row of tines at a fixed angle to said tines and arranged to follow the first cam track section as the reel rotates such that a change in position of the first cam follower causes a change in position of the tines, and
        a plurality of second cam followers each being connected to said rows of tines at a fixed angle to said tines, and being arranged to follow the second cam track section as the reel rotates such that a change in position of the second cam follower causes a change in position of the tines.

2. A harvester according to claim 1 wherein each first cam follower comprises an elongate first cam follower arm pivotally mounted on the reel at a first end and extending radially outwards therefrom to a second end, and a roller mounted at the second end of the first cam follower arm for engaging the first cam track section and traveling thereal­ong.

3. A harvester according to claim 2 wherein each second cam follower comprises an elongate second cam follower arm fixed at a first end to the first cam follower arm extending outwards therefrom to a second end, and a roller for engaging the second cam track section and traveling therealong.

4. A harvester according to claim 1 wherein the cam guide means are arranged radially around the reel and reel axis.

5. A harvester according to claim 1 wherein each tine includes a first end, and a free second end, and is pivotally mounted at the first end on the reel such that said tine may pivot about a tine axis of rotation lying parallel to the reel axis; and wherein as each tine passes below the reel axis of rotation the cam guide means rotate the tine about the tine axis in a direction counter to the direction of rotation of the reel thereby causing the free second end of the tine to move upward relative to the cutting bar to a position above and forward of the cutting bar.

6. A harvester according to claim 1 wherein the cam guide means and the cam follower means are arranged at each end of the reel.

7. A harvester according to claim 1 wherein each one of the plurality of tines is curved in shape and is arranged on the reel such that each respective tine, when passing below the reel axis is positioned to curve downward and forward to its free end.

8. A harvester according to claim 1 wherein the first cam track section describes a pathway such that as each one of the plurality of first cam followers travels along the first cam track section from the position in front of the reel axis to the position in front of and below the reel axis it is rotated relative to the reel in a direction the same as the direction in which the reel rotates thereby causing the row of tines to pivot in the same direction as the reel rotates resulting in downward and rearward movement of the tines;
    wherein a first portion of the second cam track section describes a pathway such that as each one of the plurality of second cam followers travels along the second cam track section upward and rearward from the position below the reel axis at an angle such that it is rotated relative to the reel in a direction opposite to the direction that the reel rotates thereby causing the row of tines to rotate in a direction opposite to the direction of rotation of the reel resulting in the free ends of the tines moving upward relative to the cutting bar and then rearwardly to a position above and just forward of the cutting bar;

and wherein a second portion of the second cam track-section describes a pathway such that as each second cam follower continues rearwardly along the second cam track section each second cam follower moves upwardly and rearwardly at an angle such that it is rotated relative to the reel in the same direction as the reel rotates thereby causing all the tines in the row of tines connected to each second cam follower to rotate in the same direction as the reel causing the free ends of the tines to move upward away from and rearward of the cutting bar.

9. A harvester for travelling in a forward direction over the ground and harvesting a crop, said harvester comprising:

an elongate cutting bar arranged transverse of the forward direction;

an elongate rotary reel arranged forward of the cutting bar and having a reel axis of rotation transverse of the forward direction;

a plurality of tines spaced at positions distributed around and along the axis of rotation of the reel, each one of said plurality of tines being mounted on said reel for movement therewith and extending outwards therefrom;

means for rotating the reel about the reel axis in a direction to move the tines rearward passing below the real axis towards the cutting bar;

cam guide means fixed to the harvester comprising a cam track arranged in a closed loop extending over and around the rotary reel from a rearward position forward to a position in front of the reel axis and then downward and rearward therefrom to a position located in front of and below the reel axis and then upward and rearward therefrom at a steep angle to a transition point below the reel axis and then upward and rearward therefrom at a more gradual angle to the rearward position;

cam follower means connected to the tines on the reel for following the cam guide means and guiding the movement of the tines as the reel rotates such that free ends of the tines are displaced radially inwards towards the reel axis in front of the cutting bar to lift the crops upward to a position for cutting by the cutting bar; and means for selectively varying the height to which the tines are raised comprising:

a branch in the cam track located adjacent and upstream of the rearward position said branch having a plurality of pathways arranged to align vertically with one another and arranged to converge into a single pathway at a downstream end of the branch such that movement of the cam follower along one of the plurality of pathways causes the cam follower to move upward and rearward at a corresponding one of a plurality of angles thereby causing the free ends of the tines to move to one of a plurality of corresponding heights above the cutting bar;

and a switch arranged in the cam track upstream of the branch, said switch being pivotally mounted on the cam track such that it can be selectively pivoted between a plurality of positions for directing movement of the cam follower along a corresponding one of the plurality of pathways of the branch.

10. A harvester according to claim 9 wherein the branch comprises a first pathway and a second pathway arranged below the first pathway, said first pathway having a first end at an upstream end of the branch and a second end at the downstream end of the branch and said second pathway having a first end at an upstream end of the branch and a second end at the downstream end of the branch;

and wherein the switch comprises:

a break in the cam track having a first end and a second end and extending therebetween, the first end of the break being arranged in the cam track at a location downstream from the position in front of and below the reel axis, and the second end of the break being arranged at the first end of the first pathway of the branch and the first end of the second pathway of the branch;

a section of track sized and arranged to span the break and having a first end and a second end, the first end of the section of track being arranged to lie at the first end of the break and the second end of the section of track being arranged to lie at the second end of the break;

a pivot mount mounting the switch on the cam track such that the switch can be selectively pivoted between a first position such that the switch spans the break lying between the first end of the break and the first end of the first pathway of the branch and a second position such that the switch spans the break lying between the first end of the break and the first end of the second pathway of the branch;

and actuating means arranged to move the switch between the first and second positions;

and wherein when the switch is in the first position the cam follower travels along the cam track from the position in front of and below the reel axis upward and rearward at a steep angle to the first end of the first pathway such that in the free ends of the tines move upward to a first height relative to the cutting bar and then rearwardly to a position above and just forward of the cutting bar;

and wherein when the switch is in the second position the cam follower travels along the cam track from the position in front of and below the reel axis upward and rearward at a less steep angle to the first end of the second pathway such that in the free ends of the tines move upward to a second height relative to the cutting bar and then rearwardly to a position above and just forward of the cutting bar.

11. A harvester according to claim 10 wherein the second height is lower than the first height.

* * * * *